Feb. 23, 1960 J. S. DOWNS ET AL 2,925,993
SEAT FOR GATE VALVE
Filed Dec. 27, 1956 2 Sheets-Sheet 1

Jesse S. Downs
Collier C. Pryor
INVENTORS

BY Russell E. Dehloff
ATTORNEY

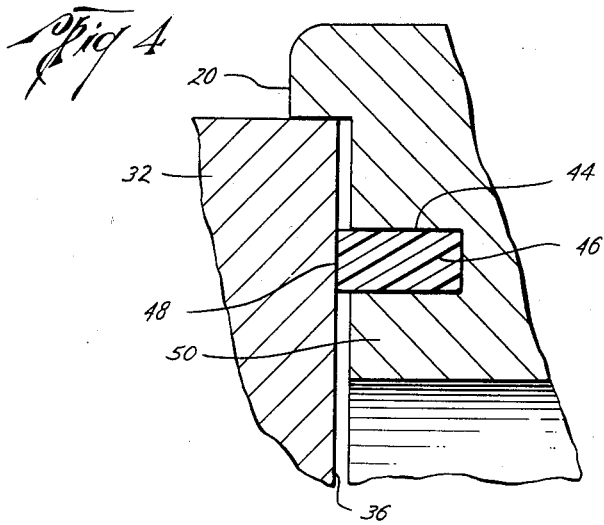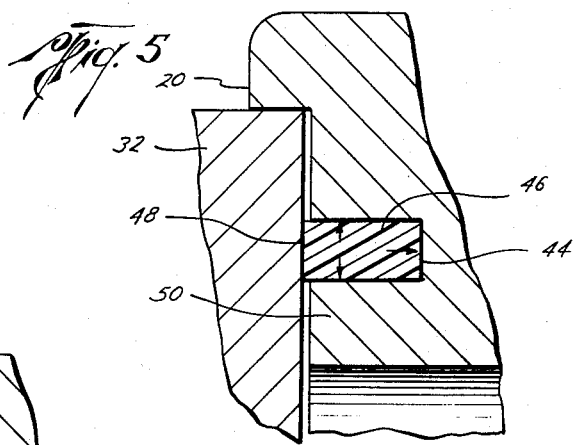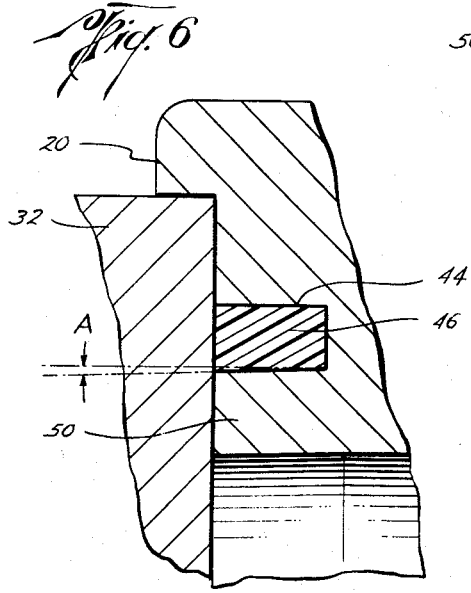

United States Patent Office 2,925,993
Patented Feb. 23, 1960

2,925,993

SEAT FOR GATE VALVE

Jesse S. Downs and Collier C. Pryor, Houston, Tex., assignors to ACF Industries, Incorporated, New York, N.Y., a corporation of New Jersey Application December 27, 1956, Serial No. 630,791

5 Claims. (Cl. 251—328)

This invention relates to gate valves, and more particularly to an improved gate valve for controlling the flow of fluids under relatively high pressures without the use of gate lubricants and free from pressure-lock problems. This application is a continuation in part of our application Serial No. 290,302, filed May 27, 1952, now abandoned.

The invention will be described with reference to gate valves, especially to a two-part gate type of valve, and even more especially to through-conduit gate valves having a forcibly expansible gate. By through-conduit gate valve is meant a valve which, when opened, presents an unbroken smooth-walled conduit for the uninterrupted passage of fluid therethrough, such a valve is fully disclosed in M. P. Laurent's U.S. Patent Re. 20,101. While such a construction provides both upstream and downstream seal, the invention can be utilized with a slab or other two piece type gate to obtain the hereinafter described desirable characteristics for the downstream side.

Because of the nature of their construction and of the sliding or wiping contact between their sealing surfaces, gate valves are subject to several practical operating difficulties. In particular, the sealing surfaces of gate valves, especially those adapted to control fluids under relatively high pressure and/or various types of chemicals, some of which may be corrosive, frequently are supplied with thick viscous grease not only for lubricating purposes, but also for sealing purposes. A film of such grease between valve sealing surfaces fills minute crevices and imperfections therein and enables a valve to operate under much higher pressures without appreciable leakage. The necessity of lubricating gate valves increases not only their manufacturing expense, but also their maintenance expense by requiring replenishment of the lubricant from time to time. Additionally, in certain types of lubricated gate valves, there may be leakage of the lubricant into the fluid passed through the valve, thereby contaminating the fluids and adding to the expense of practical operation of the valve.

Gate valves, particularly of the larger sizes, require considerable force to move the gate under high pressure, since the pressure in the upstream side of the line presses the gate tightly against the downstream valve seat. Two-part gate valves, i.e. having a two-piece valve gate each having a sealing surface cooperating with one of the valve seats, are subject to a further operating difficulty known as a pressure-lock condition. This condition occurs when the valve is closed under high pressure and the pressure on both sides of the line is subsequently lowered, or, conversely, the pressure within the valve housing rises above that on both sides of the line. This latter situation may occur upon a temperature rise with consequent expansion of the fluid trapped within the valve housing. Under a pressure-lock condition, both members of the valve gate are urged apart and held tightly against their respective valve seats by the pressure differential between the valve chamber and both sides of the line. Obviously, the force then required to slide the valve gate against the seats in order to open the valve is increased over the force normally required to open the valve. Sometimes the pressure differential is sufficiently great to bind the valve gate so tightly that it is substantially impossible to open the valve except by power-operated mechanisms. The causes and effects of a pressure-lock condition are described more fully in the U.S. patents issued in the name of Milton P. Laurent, Nos. 2,479,124 and 2,583,512.

As described in the Laurent U.S. Patent 2,479,124, springs may be incorporated in the valve gate to pull the two parts together upon their initial opening movement in an attempt to avoid the consequences of a pressure-lock condition. Such springs obviously increase the cost of a gate valve. It also will be seen that the use of lubricant between the sealing surfaces of the gate and its seats is an attempt to avoid the consequences of a pressure-lock condition, by reducing the sliding friction between such surfaces.

Hence, it is an object of this invention to provide a gate valve which eliminates the necessity of lubricating the sealing surfaces of the valve.

It is another object of this invention to provide an improved valve seat for a gate valve which reduces the sliding fraction between the gate and the seat to such an extent that the force required to open or close the valve is reduced to a minimum, in fact this force reduction is so great that the valve may readily be opened without undue effort, even under a pressure-lock condition.

It is another object of this invention to provide a gate valve which will seat so tightly that, even without lubricant on the sealing surfaces, the valve will hold extremely volatile fluids under high pressure without leakage.

It is a further object of this invention to provide a valve gate engaging member of a material which will accomplish the foregoing objects.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Figure 4 is an enlarged fragmentary sectional view of a portion of the structure shown in Figure 2, showing the gate member making initial contact with the valve gate engaging member.

Figure 5 is a view similar to Figure 4 with the gate applying load to the valve gate wiping member.

Figure 6 is a view similar to Figures 4 and 5 with the gate and seat in metal-to-metal contact.

Figure 1:
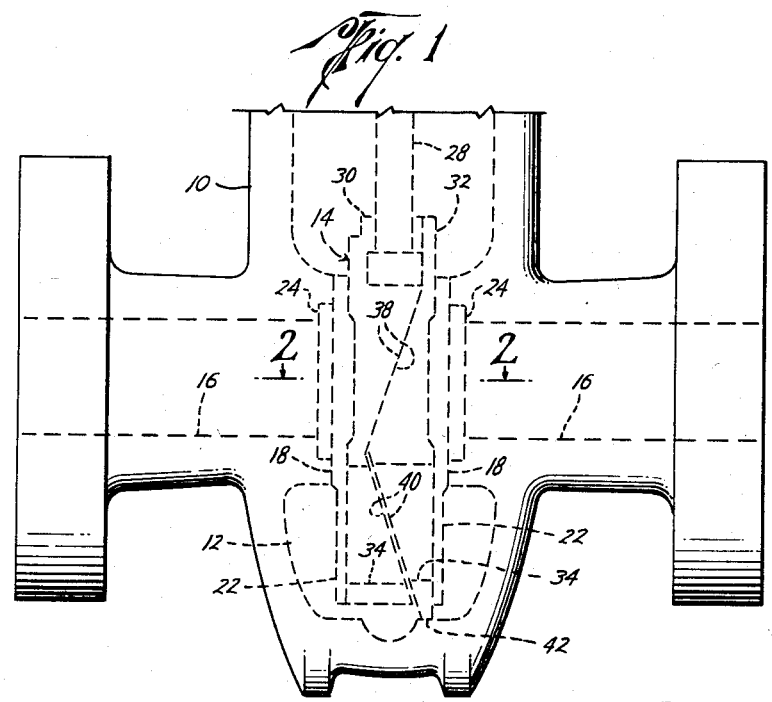
Figure 1 is a fragmentary elevational view of a gate valve embodying this invention. The valve is shown in closed position with the valve gate assembly expanded into sealing engagement with the valve seats.
Figure 2:
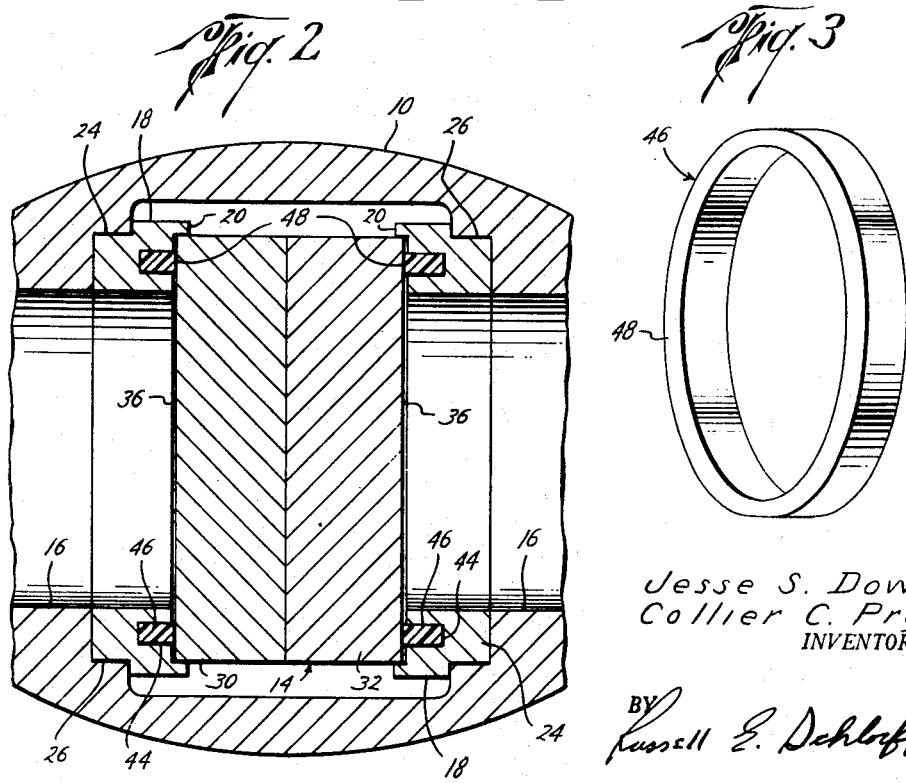
Figure 2 is a fragmentary sectional view through the valve taken substantially on the line 2—2 of Figure 1, but showing the valve gate assembly contracted from sealing engagement with the valve seats.
Figure 3:
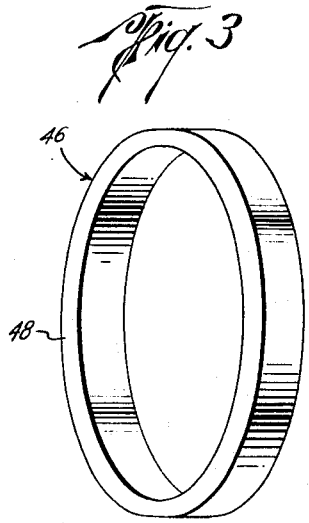
Figure 3 is a perspective view of an element of one of the valve gate wiping members.

Referring now to the drawings, there is shown in Figures 1 and 2 a through-conduit gate valve having a housing 10 providing an interior valve chamber 12 in which is housed the gate mechanism 14 of the valve. Aligned ports 16 in opposite walls of the housing 10 are provided, at their inner ends, with opposed flat-faced valve seats 18, each having side flanges 20 and a depending skirt 22, and between which the gate mechanism 14 of the valve is confined and guided for substantially rectilinear movement. The seats 18 preferably are constructed as removable inserts having annular hubs 24 which have a pressed fit in counter-bores 26 at the inner ends of the ports 16. The upper portion of the housing 10 is of known construction, having a bonnet (not shown) through which extends a valve operating stem 28 for raising and lowering the gate mechanism 14 to open and close the valve.

The ported valve gate mechanism 14, which slides between the seats 18, is formed in two sections, one herein termed the gate 30 and the other the segment 32. Both sections have ports 34 which in the open position of the valve are aligned with the housing ports 16 to form a smooth-walled unbroken passageway for unobstructed flow of fluid through the valve. The valve stem 28 is connected to the gate 30, rectilinear movement of which by the stem 28 carries the segment 32 along as a unit, as later described.

The gate 30 and segment 32, when assembled, are substantially rectangular in transverse section, i.e. as shown in Figure 2, so that their flat outer faces 36, normally of highly polished metal, are disposed parallel and opposed to the corresponding flat-faced valve seats 18 for sealing engagement therewith.

The inner opposed faces of the gate 30 and the segment 32 are illustrated as being formed with two complementary, angularly related surface portions that diverge from the midportions of the gate and the segment to form two sets 38 and 40 of mutually wedging surfaces as disclosed by Laurent U.S. Patent Re. 20,101; however, a single wedge construction well known in the art may also be utilized. When both sets 38 and 40 of these wedging surfaces are in contact, i.e. the gate 30 and segment 32 are mated, the transverse dimension of the gate assembly 14 is slightly less than the distance between the valve seats 18. Hence, when the gate assembly 14 is thus contracted, sufficient clearance exists between the assembly and the valve seats 18 to enable the assembly to be moved freely and easily by the valve stem 28. Relative endwise displacement, however, of the gate 30 and the segment 32 from their mated position, in either direction along the line of travel of the assembly 14, results in a mutual wedging action between one of the two sets 38 and 40 of the wedging surfaces. This wedging action is effective to expand the assembly 14 transversely and force the outer sealing faces 36 of the gate 30 and of the segment 32 into tight sealing engagement with their respective valve seats 18. Such relative endwise displacement is imparted to the gate 30 and to the segment 32 adjacent both ends of travel of the assembly 14 by interior abutments 42 (only one of which is shown) in the housing 10. These abutments 42 are engaged by the corresponding ends of the segment 32 and arrest the travel thereof before the gate 30, impelled by the valve stem 28, reaches its final limit of travel. Hence, the gate assembly 14 is expanded into tight sealing engagement with the valve seats 18 in both the open and closed positions of the valve.

Each of the valve seats 18 may be provided with an annular recess 44, preferably rectangular in radial section, surrounding the corresponding port. Mounted in each of these recesses 44 is a ring 46, also rectangular in radial section and of slightly greater axial thickness than the depth of the recesses so that the ring 46 projects slightly therefrom. The outer flat annular surface 48 of each ring 46 presents an endless sealing and wiping surface to the opposed metallic face 36 of the gate assembly 14, which surface surrounds the corresponding port 16.

The rings 46 are preferably formed of a synthetic resin material which is a polymer of tetrafluoroethylene. One suitable resin is known by the trade name "Teflon" and is supplied by E. I. du Pont de Nemours & Co., Inc. The physical properties of this resin include, among others, the following:

Specific gravity _____ 2.1–2.3.
Tensile strength _____ 2,000–4,500 lbs. per sq. in.
Hardness _____ 55 D. durometer.
Coefficient of expansion __ $5.5 \times 10^{-5}$ per ° F.
Moisture permeability ____ 0.00–0.5 grams per square meter per 24 hours.

In addition to the above physical properties, and insofar as is now known, this polymer tetrafluoroethylene is substantially inert to all chemicals except molten alkali metals. Said material has an extremely low coefficient of friction .04 against polished steel, in fact the coefficient of friction is so low that the material feels somewhat soapy to the touch.

Although the above-listed physical properties of said polymer are available, this material produces unexpected and unusual results when employed to form the valve gate wiping member of a gate valve seat for engagement by a slidable metallic valve member. It has been found in actual practice that when the wiping surface of the downstream seat of a gate valve includes said polymer of tetrafluoroethylene, the valve will hold fluids under high pressure without a grease seal and with no leakage of even such extremely volatile fluids as propane and butane. Heretofore valve control of such volatile fluids under high pressure without leakage could be accomplished only by augmenting the valve seal by the employment of a thick viscous grease or lubricant on the sealing surfaces. Hence, because of this unexpected property of this polymer of tetrafluoroethylene, the lubrication of the sealing surfaces of gate valves is unnecessary, and possible contamination of such fluids is eliminated. It has been found that the use of said material in gate valves permits effective metal-to-metal sealing under much higher fluid pressures than heretofore possible with any known valve constructions. It has also been found that the use of said material in gate valves also provides for an effective wiping action for maintaining the surfaces of the gate members clean.

Additionally, because of the extreme low coefficient of friction of this polymer of tetrafluoroethylene, it has also been found in actual practice that when it is used as a portion of the surface of a gate valve seat, the force required to open or close the gate valve against high pressure is reduced to a surprising extent. In fact, even under a pressure lock condition it has been found to be possible to open a two-part gate valve of large size by hand, without appreciable exertion. This overcoming of a pressure-lock condition by the use of such a resin is possible even with unlubricated sealing surfaces and without the usual springs in the gate assembly which heretofore have been necessary to successfully overcome pressure-lock.

In addition to the above novel results flowing from the use of a polymer of tetrafluoroethylene to form a wiping member of a gate valve seat, the extremely low coefficient of expansion of the material enables gate valves to control high temperature fluids without leakage. Further, the inertness of the material to almost all chemicals renders it extremely useful in valves used to control chemical fluids. Additionally, the material wears well and will last in service about as long as the usual metallic seat sealing surface.

Figures 4 through 6 illustrate the inter-action of the seat 18 and gate 32 as the gate moves into metal-to-metal contact with the seat 18. Figure 4 shows the gate 32 making initial contact with the wiping member 46. As the gate 32 moves closer to the face of the seat 18, the wiping member 46 receives the seating load from the gate 32 and transmits this load to walls of the recess 44 as indicated by the arrows shown in Figure 5. On initial closing, any voids in the material of the wiping member are compressed, also any void spaces between the wiping member and the walls of the recess are filled. In Figure 6 the gate 32 and seat 18 are in metal-to-metal contact, and the load transmitted through the wiping member 46 has forced the inner bore wall 50 inwardly as can be seen by the deflection shown by the angle A in Figure 6. Since the deflection does not exceed the elastic limit of the seat material, immediately upon the gate 32 moving away from contact with the face of the seat, the wall 50 will return to its original position and such action will cause the wiping member to return to the shape depicted in Figure 4. Inasmuch as there is almost certain to be some voids in or around the wiping member, it will not return after initial loading to its original height. However, it will recover sufficiently to present a wiping surface for the gate 32 during its movement from closed to open position or vice versa. Since the coefficient of friction of Teflon is considerably less than steel, there will be a substantial reduction in the amount of force necessary to move the gate.

The recess 44 should be so positioned with respect to the bore that when the area 50 has deflected a sufficient amount to increase the volume of recess 44 to equal the volume of the wiping member 46, the stress in the seat material has not exceeded the yield strength of the material. Also, the internal pressure built up in the resilient material of the wiping member 46 must not be sufficient to extrude the material between the seat and gate during the time load is being applied. Consideration must also be given to the modulus of elasticity of the seat material in proportioning the recess in relation to the bore.

Even though there is metal-to-metal contact between the gate and the face of the seat as seen in Figure 6, a wiping member formed of a resilient material will aid in sealing since by its resilient nature the material will tend to fill the minute crevices in the surface of the gate thereby establishing a barrier against leakage.

What is claimed is:

1. A through conduit gate valve for controlling the flow of fluids, said gate valve comprising in combination; a housing forming a valve chamber and defining aligned inlet and outlet ports, ported metal valve seats associated with said inlet and outlet ports, each of said ported seats having a flat seat surface surrounding its port and facing the flat seat surface of the other of said seats, each of said ported seats also having a recess in said seat surface and surrounding said port, two-part ported metal valve gate means slidable in said chamber across said aligned ports and expansible toward and into metal-to-metal contact with said valve seat surfaces in both the valve open and the valve closed positions of said valve gate and contractable away from said valve seat surfaces during sliding movement across said ported seats, and a resinous valve gate wiping member composed of polymerized tetrafluoroethylene pressed into and completely filling said recess in each of said valve seats and projecting above the flat surfaces of said valve seats during sliding and wiping movement of said valve gate when contracted, the distance of such upward projection of said polymerized tetrafluoroethylene members being sufficiently small that when the valve gate is expanded in valve open and valve closed positions the said polmerized tetrafluoroethylene members are forced completely into their respective grooves so that they are completely enclosed and confined against movement and cold-flow.

2. A valve seat member for a valve having passageways terminating in a valve member chamber, said seat member having a passageway aligned with the passageway of the valve, an annular portion adapted to be positioned in a counterbore of the passageway of the valve, a face portion adapted to be contacted by a valve member, said face portion having an annular recess surrounding the passageway, and a plastic annular wiping member positioned in said recess and projecting outward from said recess beyond the surface of the seat, the recess being of such proportion and so positioned with relation to the bore that the material of the seat located between the recess and the bore will deflect within its elastic limit an amount sufficient to accommodate the volume of the wiping member projecting beyond the surface of the seat as a result of force applied by a valve member.

3. A valve seat member for a valve having passageways terminating in a valve member chamber, said seat member having a passageway aligned with the passageway of the valve, an annular portion adapted to be positioned in a counterbore of the passageway of the valve, a face portion adapted to be contacted by a valve member, said face portion having an annular recess surrounding the passageway, and a plastic annular wiping member positioned in said recess and projecting outward from said recess beyond the surface of the seat, the recess being of such proportion and so located with reference to the edge of the seat that the seat material will deflect within its elastic limit an amount sufficient to accommodate the volume of the wiping member projecting beyond the surface of the seat as a result of force applied by a valve member.

4. A valve seat assembly for use with a gate valve for controlling the flow of fluid, the gate valve comprising in combination, a housing forming a valve chamber and defining aligned inlet and outlet ports and a valve gate slidable in said chamber across said aligned ports in valve closed position and position to be in intimate contact with at least one of said valve seats, said valve seat assembly including ported metal valve seats associated with one of said ports, said valve seat having a flat seat surface surrounding the port and facing the opposite port, said seat having an annular recess in said seat surface surrounding said port, the annular recess being defined by spaced parallel side walls and a bottom, and a resinous sealing and valve gate wiping element having a low coefficient of friction in said annular recess and projecting above the flat surface of said seats, whereby during sliding movement of a valve gate said element provides a low friction resistant surface for movement of the sliding gate, the recess being so proportioned and located with reference to the bore that the seat material between the recess and bore can deflect within its elastic limit an amount sufficient to accommodate the volume of the resinous wiping member projecting beyond the surface of the seat as a result of force applied by a valve gate.

5. A valve seat assembly for use with a through conduit gate valve for controlling the flow of fluid, the gate valve comprising in combination, a housing forming a valve chamber and defining aligned inlet and outlet ports and a ported metal valve gate slidable in said chamber across said aligned ports adapted in a fully closed and open position to be expanded against the aligned ports, said seat assembly including ported metal valve seats associated with said inlet and outlet ports, each of said ported seats having a flat seat surface surrounding its port and facing the flat seat surface of the other of said seats, each of said ported seats also having an annular recess in said seat surface and surrounding said port, the annular recess being defined by spaced parallel side walls and a bottom, and a resinous sealing and valve gate wiping element filling the annular recess, said element being a substantially noncompressible flowable plastic having a low coefficient of friction in each of said annular recesses in each of said valve seats and projecting above the flat surface of said sides, whereby during sliding movement of the valve gate said members provide a low friction resistant surface for movement of the sliding gate, the amount of projection of the element and the proximity of the recess to the bore of the port being such that upon pressure of the gate in valve closed position, the element is forced within the recess enabling metal-to-metal contact between the gate and seat without extrusion of the element, whereby, upon contraction of the gate from fully open or fully closed position, the wiping element returns to a position to afford a sliding surface.

References Cited in the file of this patent

UNITED STATES PATENTS

| | | |
|---|---|---|
| 2,148,628 | Laurent | Feb. 28, 1939 |
| 2,194,261 | Allen | Mar. 19, 1940 |
| 2,278,848 | Hamer | Apr. 7, 1942 |
| 2,690,360 | Young | Sept. 28, 1954 |
| 2,815,187 | Hamer | Dec. 3, 1957 |

OTHER REFERENCES

Chemical Age, vol. 6, Jan. 1, 1939 (pp. 10–14 inclusive), published by Benn Bros., London. (Copy in Div. 39.) 251–196xr.

UNITED STATES PATENT OFFICE

CERTIFICATE OF CORRECTION

Patent No. 2,925,993            February 23, 1960

Jesse S. Downs et al.

It is hereby certified that error appears in the printed specification of the above numbered patent requiring correction and that the said Letters Patent should read as corrected below.

Column 2, line 26, for "fraction" read -- friction --; column 6, line 28, for "position", second occurrence, read -- positioned --.

Signed and sealed this 13th day of September 1960.

(SEAL)
Attest:
KARL H. AXLINE
Attesting Officer

ROBERT C. WATSON
Commissioner of Patents